United States Patent
Biswas et al.

(10) Patent No.: US 9,261,939 B2
(45) Date of Patent: Feb. 16, 2016

(54) MEMORY POWER SAVINGS IN IDLE DISPLAY CASE

(71) Applicant: Apple Inc., Cupertino, CA (US)

(72) Inventors: Sukalpa Biswas, Fremont, CA (US); Shinye Shiu, Los Altos, CA (US); Cyril de la Cropte de Chanterac, San Francisco, CA (US); Manu Gulati, Saratoga, CA (US); Pulkit Desai, Santa Clara, CA (US); Rong Zhang Hu, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 13/890,306

(22) Filed: May 9, 2013

(65) Prior Publication Data

US 2014/0337649 A1 Nov. 13, 2014

(51) Int. Cl.
*G06F 1/32* (2006.01)
*G06F 3/14* (2006.01)
*G09G 5/00* (2006.01)
*G09G 5/393* (2006.01)
*G09G 5/395* (2006.01)

(52) U.S. Cl.
CPC ............... *G06F 1/3218* (2013.01); *G06F 3/14* (2013.01); *G09G 5/001* (2013.01); *G09G 5/393* (2013.01); *G09G 5/395* (2013.01); *G09G 2330/02* (2013.01); *G09G 2330/021* (2013.01); *G09G 2360/121* (2013.01)

(58) Field of Classification Search
CPC ......... G06F 1/3218; G06F 3/14; G09G 5/001; G09G 5/393; G09G 5/395; G09G 2330/02; G09G 2330/021; G09G 2360/121
See application file for complete search history.

(56) References Cited

U.S. PATENT DOCUMENTS

| 5,512,921 A | 4/1996 | Mital et al. |
| 5,961,617 A | 10/1999 | Tsang |

(Continued)

FOREIGN PATENT DOCUMENTS

| TW | I323842 B | 4/2010 |
| TW | 201250695 A | 12/2012 |

OTHER PUBLICATIONS

U.S. Appl. No. 13/850,565, filed Mar. 26, 2013, entitled "Mechanism to Detect Idle Screen On," inventors Brijesh Tripathi, Peter Holland, and Albert Kuo.

(Continued)

*Primary Examiner* — Thuan Du
(74) *Attorney, Agent, or Firm* — Meyertons, Hood, Kivlin, Kowert & Goetzel, P.C.; Lawrence J. Merkel (57) ABSTRACT

In an embodiment, a system includes a memory controller that includes a memory cache and a display controller configured to control a display. The system may be configured to detect that the images being displayed are essentially static, and may be configured to cause the display controller to request allocation in the memory cache for source frame buffer data. In some embodiments, the system may also alter power management configuration in the memory cache to prevent the memory cache from shutting down or reducing its effective size during the idle screen case, so that the frame buffer data may remain cached. During times that the display is dynamically changing, the frame buffer data may not be cached in the memory cache and the power management configuration may permit the shutting down/size reduction in the memory cache.

20 Claims, 7 Drawing Sheets

(56) References Cited

U.S. PATENT DOCUMENTS

| | | | |
|---|---|---|---|
| 6,731,290 | B2 | 5/2004 | Cui |
| 7,042,461 | B2 | 5/2006 | Cui |
| 7,152,187 | B2 | 12/2006 | Tran et al. |
| 7,853,817 | B2 | 12/2010 | Yarak |
| 8,103,894 | B2 | 1/2012 | Balakrishnan et al. |
| 8,285,936 | B2 | 10/2012 | Roberts et al. |
| 9,058,676 | B2 | 6/2015 | Tripathi et al. |
| 2004/0174369 | A1 | 9/2004 | Cui |
| 2006/0143382 | A1 | 6/2006 | Damaraju et al. |
| 2007/0186057 | A1 | 8/2007 | Moll et al. |
| 2007/0288776 | A1 | 12/2007 | DeMent et al. |
| 2008/0100636 | A1 | 5/2008 | Lai et al. |
| 2008/0143695 | A1 | 6/2008 | Juenemann et al. |
| 2010/0122100 | A1* | 5/2010 | Strumper ............... 713/320 |
| 2010/0123727 | A1* | 5/2010 | Kwa et al. ............... 345/522 |
| 2011/0199377 | A1 | 8/2011 | Jang et al. |
| 2012/0159074 | A1 | 6/2012 | Sodhi et al. |
| 2012/0188262 | A1 | 7/2012 | Rabii |
| 2012/0324145 | A1 | 12/2012 | Teo |
| 2014/0181410 | A1* | 6/2014 | Kalamatianos et al. ...... 711/133 |

OTHER PUBLICATIONS

Han et al.; "Using Checksum to Reduce Power Consumption of Display Systems for Low-Motion Content;" Proc. IEEE International Conference on Computer Design, Oct. 4-7, 2009, Lake Tahoe, CA; pp. 47-53.

U.S. Appl. No. 13/850,548, filed Mar. 26, 2013, entitled "Compressed Frame Writeback and Read for Display in Idle Screen on Case," inventors Brijesh Tripathi, Peter Holland, and Albert Kuo.

U.S. Appl. No. 13/866,282, filed Apr. 19, 2013, entitled "A Cache Allocation Scheme Optimized for Browsing Applications," inventors Sukalpa Biswas, Wolfgang Klingauf, Rong Zhang Hu, and Shinye Shiu.

International Search Report and Written Opinion from PCT/US2014/032811, mailed Jun. 30, 2014, Apple Inc., pp. 1-8.

"Drowsy Caches: Simple Techniques for Reducing Leakage Power", Krisztian Flautner, et al., May 25, 2002, pp. 148-157.

Office Action from U.S. Appl. No. 13/850,565, issued Nov. 28, 2014, pp. 1-13.

Office Action from U.S. Appl. No. 13/850,548, filed Mar. 26, 2013, mailed Apr. 7, 2015, pp. 1-10.

Office Action, Taiwan Application No. 103114566, issued Sep. 23, 2015, 10 pages.

International Preliminary Report on Patentability Application No. PCT/US2014/032811, issued Nov. 19, 2015, 6 pages.

* cited by examiner

Instantaneous Probabilities $$P_i(Idle\ |< idle, active >) = P_i$$
$$P_a(Active\ |< idle, active >) = P_a$$
$$P(Deadzone\ |< P_i = 0, P_a = 0 >) = 1$$

Filtered Probabilities $$F_i^n = \alpha * P_i + (1-\alpha) * F_i^{n-1}$$
$$F_a^n = \beta * P_a + (1-\beta) * F_a^{n-1}$$

MEMORY POWER SAVINGS IN IDLE DISPLAY CASE

BACKGROUND

1. Field of the Invention

This invention is related to the field of digital systems including integrated circuits, display devices, and caches.

2. Description of the Related Art

Digital systems of various types often include, or are connected to, a display for the user to interact with the device. The display can be incorporated into the device. Examples of incorporated displays include the touchscreen on various smart phones, tablet computers, or other personal digital assistants. Another example of the incorporated display is a laptop with the screen in the lid. The display can also be connected to the device via a cable. Examples of the connected display include various desktop computers and workstations having a separate display that resides on the desk in front of the user. Some desktops also have an incorporated display (e.g. various iMac® computers from Apple Inc.). The display provides a visual interface that the user can view to interact with the system and applications executing on the system. In some cases (e.g. touchscreens), the display also provides a user interface to input to the system. Other user input devices (e.g. keyboards, mice or other pointing devices, etc.) can also be included.

In many cases, the images being display over a period of time are essentially static. For example, if the user is reading an ebook on the display, the display may be statically displaying a page of text until the user is finished reading the page. When a movie is paused, there may be no change in the images for the time that the pause is in effect. When a user is browsing web pages, again the user may be absorbing content and the images may be static. When there is little or no change in the static images being displayed, the memory bandwidth consumed to fetch the image each refresh cycle of the screen may be wasteful in both the bandwidth and in power consumed.

SUMMARY

In an embodiment, a system includes a memory controller that includes a memory cache and a display controller configured to control a display. The system may be configured to detect that the images being displayed are essentially static, and may be configured to cause the display controller to request allocation in the memory cache for source frame buffer data. Power that would otherwise be consumed on the external memory interface may be conserved by caching the frame buffer data (or at least a portion of the frame buffer data) in the memory cache. In some embodiments, the system may also alter power management configuration in the memory cache to prevent the memory cache from shutting down or reducing its effective size during the idle screen case, so that the frame buffer data may remain cached. During times that the displayed images are dynamically changing, the frame buffer data may not be cached in the memory cache and the power management configuration may permit the shutting down/size reduction in the memory cache.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Figure 1:
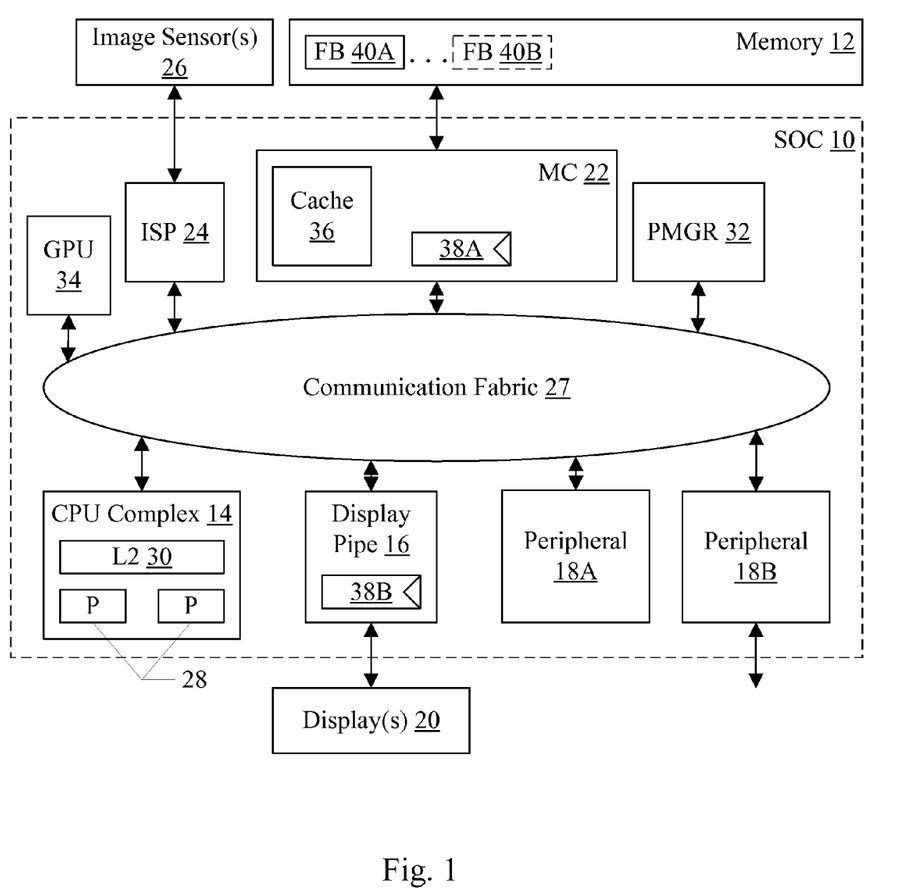
FIG. 1 is a block diagram of one embodiment of a system including a system on a chip (SOC), a memory, image sensors, and display devices.

Turning now to FIG. 1, a block diagram of one embodiment of an SOC 10 is shown coupled to a memory 12, one or more image sensors 26, and one or more displays 20. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, a display pipe 16, peripheral components 18A-18B (more briefly, "peripherals"), a memory controller 22, an image signal processor (ISP) 24, a graphics processing unit (GPU) 34, a power manager (PMGR) 32, and a communication fabric 27. The components 14, 16, 18A-18B, 22, 24, 32, and 34 may all be coupled to the communication fabric 27. The memory controller 22 may be coupled to the memory 12 during use. Similarly, the ISP 24 may be coupled to the image sensors 26 during use and the display pipe 16 may be coupled to the displays 20 during use. In the illustrated embodiment, the CPU complex 14 includes one or more processors 28 and a level two (L2) cache 30. In the illustrated embodiment, memory controller includes a memory cache 36. Both the memory controller 22 and the display pipe 16 may include configuration registers 38A-38B, respectively. Other components may also include configuration registers as well, not shown in FIG. 1. The memory 12 may store one or more frame buffers including frame buffer 40A and optionally frame buffer 40B during use.

The display pipe 16 may include hardware to process one or more still frames and/or one or more video sequences for display on the displays 20. Generally, for each source still frame or source video sequence frame, the display pipe 16 may be configured to generate read memory operations to read the data representing the frame from the memory 12 through the memory controller 22. Each frame may be stored in a frame buffer 40A-40B in the memory 12, for example, and the display pipe 16 may be programmed with pointers to the frame buffers 40A-40B in memory 12 to read the frames from the frame buffers. Each frame may include image data that describes the image to be displayed, e.g. pixels, color components, alpha blending values, etc.

The display pipe 16 may be configured to perform any type of processing on the image data. In one embodiment, the display pipe 16 may be configured to scale still frames and to dither, scale, and/or perform color space conversion on the frames of a video sequence. The display pipe 16 may be configured to blend the still frames and the video sequence frames to produce output frames for display. The display pipe 16 may also be more generally referred to as a display control unit. A display control unit (or display controller) may generally be any hardware configured to prepare a frame for display (from one or more sources, such as still frames and/or video sequence frames). The various processing performed by the display pipe 16 may generally be referred to as compositing. Compositing may include any processing by which image data from various images are combined to produce an output image.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.).

In the illustrated embodiment, the memory controller 22 may include a memory cache 36 to store recently accessed memory data. In SOC implementations, for example, the memory cache 36 may reduce power consumption in the SOC by avoiding reaccess of data from the memory 12 if it is expected to be accessed again soon. Thus, the memory cache 36 may be accessed by the memory controller 22 to detect a hit/miss for memory operations prior to accessing the memory 12. If the memory operation is a hit in the memory cache 36, the memory 12 may not be accessed. The communication fabric 27 may support the transmission of cache hints with the memory operations to identify candidates for storing in the memory cache 36. The memory cache 36 may thus store data corresponding to any component in the SOC 10 that accesses memory. In some cases, the memory cache may also be referred to as a system cache, as opposed to private caches such as the L2 cache 30 or caches in the processors 28, which serve only certain components. Additionally, in some embodiments, a system cache need not be located within the memory controller 22.

In the case of frame data, such as data in the frame buffers 40A-40B, the consumer is the display pipe 16. Typically, a given frame buffer may be read once by the display pipe 16, because the frame may typically be changed to the next image to be displayed prior to the display pipe 16 initiating a new frame. For example, a frame rate of 30 or 60 frames per second is frequently used. Thus, a frame is read 30 or 60 times per second. In between, the sources of the frame data (e.g. video decoders, the GPU 34, etc.) may be generating new frames to be displayed and may be writing frame data in different memory locations. When the next frame read begins, the frame may be read from the different memory locations. Accordingly, in the case in which the image being displayed is changing from frame to frame, caching of the frame data may be disabled in the memory cache 36. The case in which frame data is generally changing over time may be referred to as a dynamic display, or a dynamic display state. The image being displayed by the display may be referred to as dynamic.

On the other hand, there may be cases in which multiple successive frames have static content. Generally, static content may refer to content that is not changing from frame to frame (e.g. each pixel is the same from frame to frame) or to content that is changing by less than a threshold amount, so that a previous frame is a close approximation to the current frame. Detecting multiple successive frames having the static content may identify an idle display state or idle display case (or idle screen on case, since the display screen is still on and displaying the static image). The idle display case may be the case in which the displayed visual content is not changing over a period of time, or is changing very little, but the display is on. The user may be viewing the displayed data, such as an ebook, a web page or an email. Or, the user may have paused a video. The case in which frame data is generally static may be referred to as an idle display, or an idle display state, and the image being displayed by the display may be referred to as idle, or static.

In the idle display case, the display pipe 16 may still be the only consumer of the frame data. However, the same frame data may be read multiple times. Accordingly, enabling caching for the idle display case may be desirable. More particularly, the display pipe 16 may be programmable (e.g. in the configuration registers 38B) to enable or disable caching in the memory cache 36. If caching is enabled, the display pipe 16 may be configured to transmit memory read operations to read the frame buffers 40A-40B with a cache hint indicating that the data should be allocated in the memory cache 36. In some embodiments, if more than one frame is being composited to produce output frames, the frame that contains the most frame data may be cached (by including the cache allocate hint) and other frames may not be. In other embodiments, multiple frames may fit in the memory cache 36 and the multiple frames may be cached. In other embodiments, only a portion of a frame may fit in the memory cache 36 and the display pipe 16 may be configured to provide the cache allocate hint for a portion of the frame. On the other hand, if caching is disabled, the display pipe 16 may provide a cache hint indicating no caching. The caching may be disabled in the dynamic display case, as mentioned above. In an embodiment, the idle display case may also include determining that other memory-accessing components that may benefit from caching in the memory cache 36 are off. For example, the processors 28, the GPU 34, the ISP 24, and other media devices may benefit from caching. Other components that may not benefit from caching need not be off, e.g. various interface controllers to interfaces such as $I^2C$ (Inter-Integrated Circuit), universal asynchronous receiver-transmitter (UART), system packet interface (SPI), etc. Thus, the idle display case may include at least the subset of components that use the memory cache 36 being off, the display pipe 16/display 20 being on, and the displayed image being static.

In some embodiments, the memory cache 36 may support various power management features. The power management features may be controlled by programming the configuration registers 38A. The power management features may be modified in response to detecting a change from the dynamic display state to the idle display state. For example, even though the display pipe 16 may read the frame data repeatedly in the idle screen state, the reads may be separated by many clock cycles at the frequency of memory cache 36. Additionally, many other components of the SOC 10 may be idle in the idle display state, as mentioned above. For example, other audio/video devices such as the GPU 34, the ISP 24, video encoders/decoders, etc. may be idle since there is no content generation being performed. Accordingly, the system may appear to be relatively idle to the memory controller 22/memory cache 36, which may cause power management mechanisms to activate. The mechanisms may include, e.g., reducing the effective size of the cache by powering down portions of the cache, powering the cache off, etc. During the idle display state, the memory controller 22 may be programmed to disable these power management mechanisms so that the memory cache 36 remains powered up and full size, storing the frame data. During the dynamic display state, the memory controller 22 may be programmed to enable the power management mechanisms.

In one embodiment, software executed by processors 28 may detect the idle display and dynamic display states, and may program the configuration registers 38A-38B as described above. The software may include a power manager driver (PMGR driver) corresponding to the PMGR 32, a display driver corresponding to the display pipe 16, and a memory controller driver corresponding to the memory controller 22/memory cache 36. Additional details of one embodiment are discussed in further detail below. The software may be stored in the memory 12 for fetching and execution by the processors 28, and may be cached in the L2 cache 30 and/or caches within the processors 28 as well. The software may also be stored in non-volatile memory in the system such as flash memory, solid state disk storage, magnetic or optical disk storage, etc.

The displays 20 may be any sort of visual display devices. The displays may include, for example, touch screen style displays for mobile devices such as smart phones, tablets, etc. Various displays 20 may include liquid crystal display (LCD), light emitting diode (LED), plasma, cathode ray tube (CRT), etc. The displays may be integrated into a system including the SoC 10 (e.g. a smart phone or tablet) and/or may be a separately housed device such as a computer monitor, television, or other device.

The ISP 24 may be configured to receive image sensor data from the image sensors 26 and may be configured to process the data to produce image frames that may be suitable, e.g., for display on a display 20. The image sensors 26 may include cameras (e.g. charge coupled devices (CCDs), complementary metal-oxide-semiconductor (CMOS) sensors, etc.).

The GPU 34 may include one or more GPU processors, and may further include local caches for the GPUs and/or an interface circuit for interfacing to the other components of the SOC 10 (e.g. an interface to the communication fabric 27). Generally, GPU processors may be processors that are optimized for performing operations in a graphics pipeline to render objects into a frame. For example, the operations may include transformation and lighting, triangle assembly, rasterization, shading, texturizing, etc.

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The software executed by the processors 28 may include the various drivers mentioned above and described in more detail below. The processors 28 may also execute other software, such as application programs. The application programs may provide user functionality, and may rely on the operating system for lower level device control. Accordingly, the processors 28 may also be referred to as application processors. The CPU complex 14 may further include other hardware such as the L2 cache 30 and/or and interface to the other components of the system (e.g. an interface to the communication fabric 27).

The peripherals 18A-18B may be any set of additional hardware functionality included in the SOC 10. For example, the peripherals 18A-18B may include video peripherals such as video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The PMGR 32 may be configured to control the power up and power down of other components of the SOC 10. That is, the PMGR 32 may cause other components to power up and power down. The PMGR 32 may be under direct software control (e.g. software may directly request the power up and/ or power down of components) and/or may be configured to monitor the SOC 10 and determine when various components are to be powered up or powered down. The PMGR 32 may also be configured to transition components between different power states (e.g. voltage/frequency combinations). The PMGR 32 may further be configured to request various voltage magnitudes for components in the SOC 10 from an external power controller.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
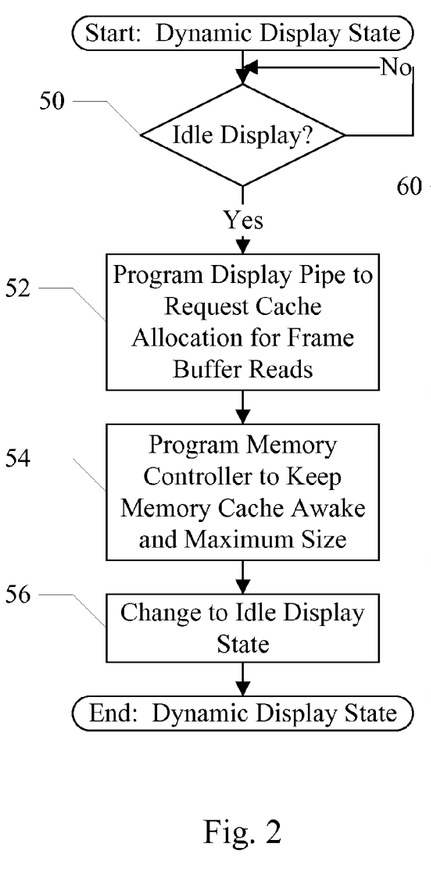
FIG. 2 is a flowchart illustrating operation of one embodiment of the system in a dynamic display state.

Turning now to FIG. 2, a flowchart is shown illustrating operation of one embodiment of the system shown in FIG. 1 in the dynamic display state to detect the idle display case and transition to the idle display state. Other operation that occurs in the dynamic display state is not shown. While the blocks are shown in a particular order for ease of understanding, other orders may be used. In an embodiment, the operation of FIG. 2 may be implemented in software, and thus the software may include instructions which, when executed, implement the operation shown in FIG. 2. Other embodiments may implement the features shown in FIG. 2 in hardware and/or a combination of hardware and software.

In the dynamic display state, the system may monitor to detect the idle display case. The idle display may be detected in a variety of ways: by analyzing successive frames for change, by noting that the same frame buffer is used for successive frames, etc. Additionally, in some embodiments, that state of other components such as the CPU complex 14, the GPU 34, the ISP 24, and/or the peripherals 18A-18B may factor into whether or not the idle display case is detected. If the idle display case is detected (decision block 50, "yes" leg), the system may program the display pipe configuration registers 38B to request cache allocation for frame buffer reads (block 52). Viewed in another way, caching of frame data may be enabled. In an embodiment, memory operations transmitted over the communication fabric 27 may include a cache hint, and the display pipe may use a cache hint indicating cache allocate if caching is enabled. The system may also program the memory controller configuration registers 38A to modify the power management controls of the memory cache 36 (block 54). Specifically, powering down of the cache 36 may be disabled (ensuring that the memory cache 36 remains "awake" during the idle display state). Cache auto resizing features (which may be used to reduce the effective size of the cache 36 by powering off sections of the cache) may also be disabled to ensure that the cache 36 remains at the maximum size in the idle display case. The system may transition to an idle display state (block 56).

Figure 3:
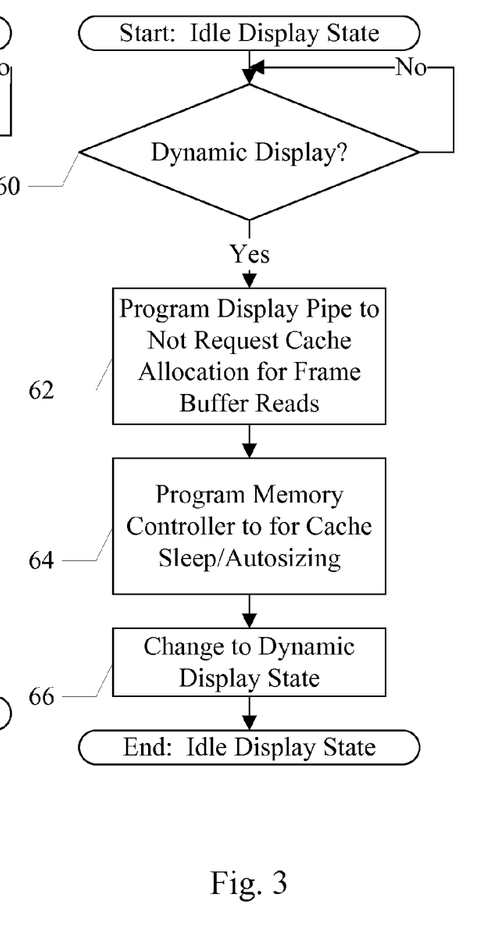
FIG. 3 is a flowchart illustrating operation of one embodiment of the system in an idle display state.

FIG. 3 is a flowchart illustrating operation of one embodiment of the system shown in FIG. 1 in the idle display state to detect the dynamic display case and transition to the dynamic display state. While the blocks are shown in a particular order for ease of understanding, other orders may be used. Other operation that may occur in the idle display state is not shown. In an embodiment, the operation of FIG. 3 may be implemented in software, and thus the software may include instructions which, when executed, implement the operation shown in FIG. 3. Other embodiments may implement the features shown in FIG. 3 in hardware and/or a combination of hardware and software.

In the idle display state, the system may monitor to detect the dynamic display case. The dynamic display may be detected in a variety of ways: by analyzing successive frames for change, by noting that a change in the frame buffer used for successive frames, etc. Additionally, in some embodiments, that state of other components such as the CPU complex 14, the GPU 34, the ISP 24, and/or the peripherals 18A-18B may factor into whether or not the dynamic display case is detected. If the dynamic display case is detected (decision block 60, "yes" leg), the system may program the display pipe configuration registers 38B to not request cache allocation for frame buffer reads (block 62). In an embodiment, a cache hint indicating no cache is supported, and may be used for frame buffer data reads in the dynamic display state. Viewed in another way, caching of frame data may be disabled. The system may also program the memory controller configuration registers 38A to modify the power management controls of the memory cache 36 (block 64). Specifically, powering down of the cache 36 (cache sleep) may be enabled and cache auto resizing features (which may be used to reduce the effective size of the cache 36 by powering off sections of the cache) may also be enabled to permit power savings when cache utilization is low. The system may transition to the dynamic display state (block 66).

Figure 4:
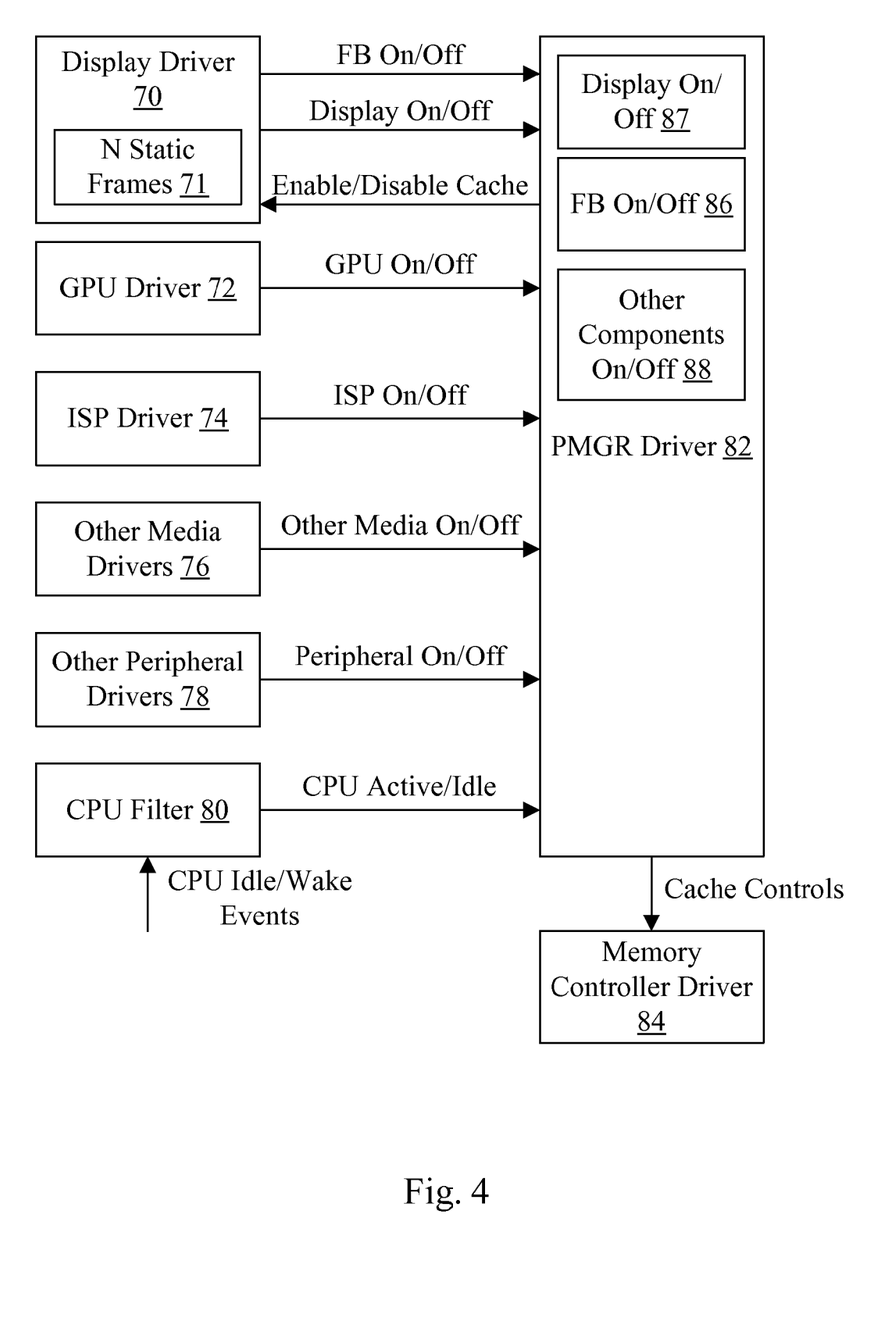
FIG. 4 is a block diagram of various software modules that may be executed in one embodiment of the system.

FIG. 4 is a block diagram illustrating various software modules which may participate in one embodiment the idle display/dynamic display state determination and management. The illustrated embodiment includes a display driver 70, a GPU driver 72, an ISP driver 74, other media drivers 76, other peripheral drivers 78, a CPU filter 80, a PMGR driver 82, and a memory controller driver 84. The PMGR driver 82 may include a frame buffer on/off state 86, a display on/off state 87, and other on/off states 88. Certain communication between the drivers is illustrated in FIG. 4 as well. Generally, the drivers illustrated in FIG. 4 may be stored in the memory 12 during use and may be executed on the processors 28 during use. The drivers may also be stored in a non-volatile storage medium in the system (e.g. a flash memory or other non-volatile memory coupled to the SOC 10).

The PMGR driver 82 may be responsible for monitoring the power states of the various components of the SOC 10, and may receive power on and power off requests from corresponding drivers to power up and power down the components. The PMGR driver 82 may interact with the PMGR 32 to power up and power down the components, referred to as power on and power off events, respectively. That is, a power on event may be an occurrence of powering on a component that is powered off (also referred to as powering up a component that is powered down). A power off event may be an occurrence of powering off a component that is powered on (also referred to as powering down a component that is powered up). The PMGR 32 may include circuitry to control local power switches within the SOC 10 to power up and power down components, as well as circuitry to request various voltage levels to be supplied to the SOC 10 on the power supply inputs. The PMGR 32 may also be configured to automatically power up and power down components based on hardware monitoring, in some embodiments.

Accordingly, as illustrated in FIG. 4, the GPU driver 72 may request that the GPU 34 be powered on when there is GPU work to be performed. The GPU driver 72 may be called by the operating system and/or applications executing on the processors 28 to perform various rendering activities. Similarly, when the GPU 34 has completed the outstanding work and there is no additional work to perform at the current time, the GPU driver 72 may request that the GPU 34 be powered off.

Similarly, if the operating system/application needs to capture some image sensor data and ISP 24 is powered off, the operating system/application may call the ISP driver 74 to power on the ISP 24 and the ISP driver 74 may request a power on from the PMGR driver 82. The ISP driver 74 may request that the ISP 24 be powered off when there is no more image data to be captured. Other media drivers 76 and other peripheral drivers 78 may similarly transmit power on/off requests to the PMGR driver 82. The display driver 70 may request that the display pipe be powered on/off (Display On/Off request in FIG. 4) if the display is being turned off or deactivated.

The PMGR driver 82 may program the PMGR 32 to power on/off the requested component and may record the power on/off state of the corresponding component in the on/off state 88 in response to the various power on/off requests. The display on/off state 87 may be updated for the display on/off requests from the display driver 70. In some embodiments, at least with respect to determining the idle/dynamic display case, the PMGR driver 82 may only maintain a count of the components of interest that are on. When the count reaches 0, all components that affect the idle/dynamic display state determination may be off. A non-zero count indicates the number of such components that are on.

In the illustrated embodiment, the frame buffer is also virtualized as a component, and is recorded as being on/off in the on/off state 86. The PMGR driver 82 may be configured to record the on/off state of the frame buffer from the FB on/off requests transmitted by the display driver 70, which may be generated based on the detection of static frames by the display driver 70 (N static frames 71 in FIG. 4). In this embodiment, the display driver 70 may be responsible for monitoring for static frames, and may indicate when N consecutive static frames have been detected, where N is an integer greater then one. N may be a programmable parameter in some embodiments. In response to detecting N static frames, the display driver 70 may request that the frame buffer be powered off (FB On/Off request in FIG. 4). If fewer than N static frames have been detected, including zero static frames, the display driver 70 may request that the frame buffer be powered on. Based on the frame buffer on/off request and the on/off state of other components in the SOC 10, the PMGR driver 82 may detect the idle/dynamic display state. Based on the detected idle/dynamic display state, the PMGR driver 82 may enable/disable caching of frame buffer data (communicated to the display driver 70, which may program the display pipe 16) and may modify cache power management controls (communicated to the memory controller driver 84, which may program the memory controller 22/memory cache 36).

More particularly, some components may be related to whether or not the display is idle. For example, if the GPU 34 is powered on, it may be rendering new frames for display. If the ISP 24 is powered on, image data may be captured that may be likely to be displayed soon. There may be other media components or peripheral components that may be related to the idle/dynamic display state as well. Also, the state of the CPU complex 14 may be related to the idle/dynamic display state. The state of the CPU may be filtered as described in more detail below. Any subset of SOC components may be considered in determining the idle/dynamic display state. Furthermore, as mentioned previously, some components may benefit from using the memory cache 36, and if such components are on the idle display state may not be detected so that the frame buffer data does not displace data from the other components.

The display driver 70 may detect the N static frames in a variety of fashions. For example, the display pipe 16 may include hardware support to detect static frames (e.g. cyclical redundancy check (CRC) computations over the frames may be compared, or CRC computations over configuration information may be compared). As another example, the display driver 70 may program the frame buffer locations into the display pipe 16, and may detect that the same frame buffer(s) is/are used for N consecutive frames.

The CPU filter 80 may monitor sleep and wake events (power off and power on events) for the processors 28, and may filter certain on/off events that may not be related to the idle/dynamic display case. For example, the processors 28 may be awakened to handle various system management events (e.g. device interrupts, periodic operating system code execution to ensure the system is operating correctly and to potentially schedule threads for execution, etc.). These events may be short lived (i.e. the awaken event may be quickly followed by an idle event that puts the processor back to sleep). The CPU filter 80 may be executed on wake and idle events to monitor CPU active versus CPU idle time. Times that are less than a threshold amount may be filtered. The CPU filter 80 may provide corresponding active/idle indications to the PMGR driver 82 to determine whether or not the processors 28 are viewed as powered on for purposes of idle/dynamic display detection. In one embodiment, the active/idle indications may be probabilities of being active and idle.

Figure 5:
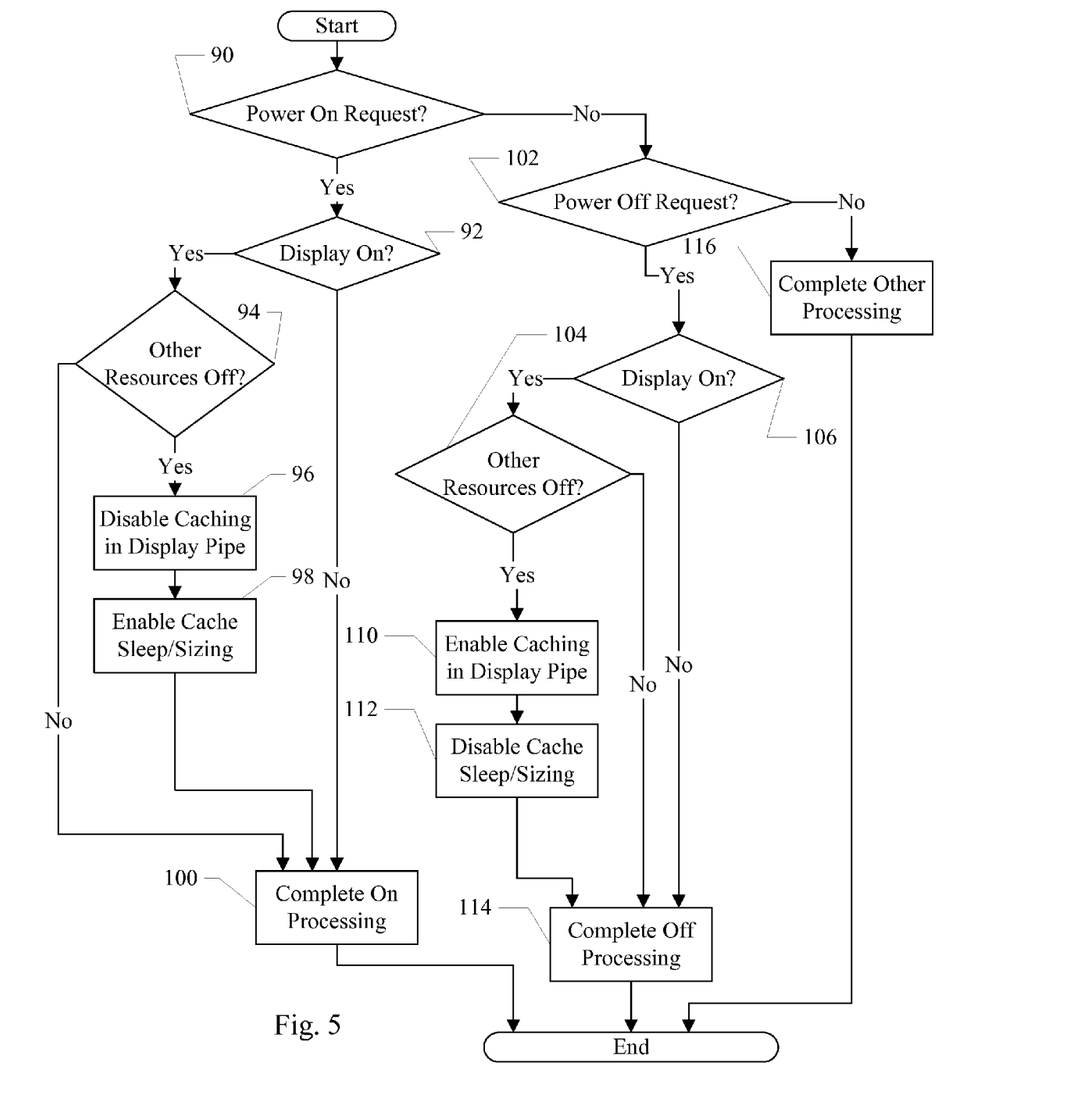
FIG. 5 is a flowchart illustrating operation of one embodiment of a PMGR driver shown in FIG. 4.

FIG. 5 is a flowchart illustrating operation of one embodiment of the PMGR driver 82 for idle/dynamic display detection. While the blocks are shown in a particular order for ease of understanding, other orders may be used. In an embodiment, the operation of FIG. 5 may be implemented in software, and thus the software may include instructions which, when executed, implement the operation shown in FIG. 5. Other embodiments may implement the features shown in FIG. 5 in hardware and/or a combination of hardware and software.

If the PMGR driver 82 has received a power on request from a driver (decision block 90, "yes" leg), the display is on (display on/off state 87 is on) (decision block 92, "yes" leg), and on or more of the other resources that affect the idle/dynamic display state determination are on (decision block 94, "yes" leg), the PMGR driver 82 may change from the idle display state to the dynamic display state and thus may disable caching in the display pipe 16 (by transmitting an indication to the display driver 70—block 96), and enable cache sleeping/auto resizing (by transmitting an indication to the memory controller driver 84—block 98). As mentioned above, the number of other components that are on may be tracked, in some embodiments, and thus decision block 94 may be implemented by determining whether or not the number is zero. Thus, decision block 90, "yes" leg, decision block 92, "yes" leg, and decision block 94, "yes" leg may together be an embodiment of detecting the dynamic display case (decision block 60, "yes" leg in FIG. 3). The PMGR driver 82 may complete the on processing of the requested component as well (block 100). Completing the on processing may include, e.g., programming the PMGR 32 to power on the component and recording the state as "on" in the on/off states 88 and/or incrementing the number of on components for idle/dynamic display state determination. In embodiments in which a subset of the components are monitored to determine the idle/dynamic display cases, the decision block 90 may consider power on requests only for components in the subset. If the PMGR driver 82 has received a power on request from a driver (decision block 90, "yes" leg) and either the display is not currently on (decision block 92, "no" leg) or at least one of the other resources that affect the idle/dynamic display state determination is on (decision block 94, "no" leg), the PMGR driver 82 may complete the on processing of the requested component without any additional work related to idle/dynamic display detection (block 100).

If the PMGR driver 82 has received a power off request from a driver (decision block 102, "yes" leg), the display is currently in the dynamic display state. The PMGR driver 82 may determine if the display is currently on (decision block 106, "yes" leg) and if so may determine if other components of the SOC 10 that need to be off to transition to the idle display state are off (decision block 104). Determining that the other components are off may be implemented by checking the on/off states 88, for example, or by checking the count of the number of on components. If so (decision block 104, "yes" leg), the PMGR driver 82 may change from the dynamic display state to the idle display state and may enable caching in the display pipe 16 (by transmitting an indication to the display driver 70—block 110), and disable cache sleeping/auto resizing (by transmitting an indication to the memory controller driver 84—block 112). Thus, decision block 102—yes leg, decision block 104—yes leg, and decision block 106—yes leg may together be an embodiment of idle display determination (e.g. decision block 50, "yes" leg in FIG. 2). The PMGR driver 82 may complete the off processing of the requested component as well (block 114). The off processing may include, e.g., programming the PMGR 32 to power on the component and changing the state to off in the on/off states 88 and/or decrementing the number of on components for idle/dynamic display state determination. If the PMGR driver 82 has received a power off request from a driver (decision block 102, "yes" leg) and either the other components needed to transition to the idle display state are not off or fewer than N static frames have been detected (decision blocks 104 and 106, "no" legs, respectively), the PMGR driver 82 may complete the off processing of the requested component without any additional work (block 114). Finally, if the received request is neither a power on request or a power off request for a component that is needed to change display state (decision blocks 90 and 102, "no" legs), the PMGR driver 82 may complete the processing of the request (block 116), which may include a power on or power off request for a component that is not needed to determine the display state.

Figure 6:
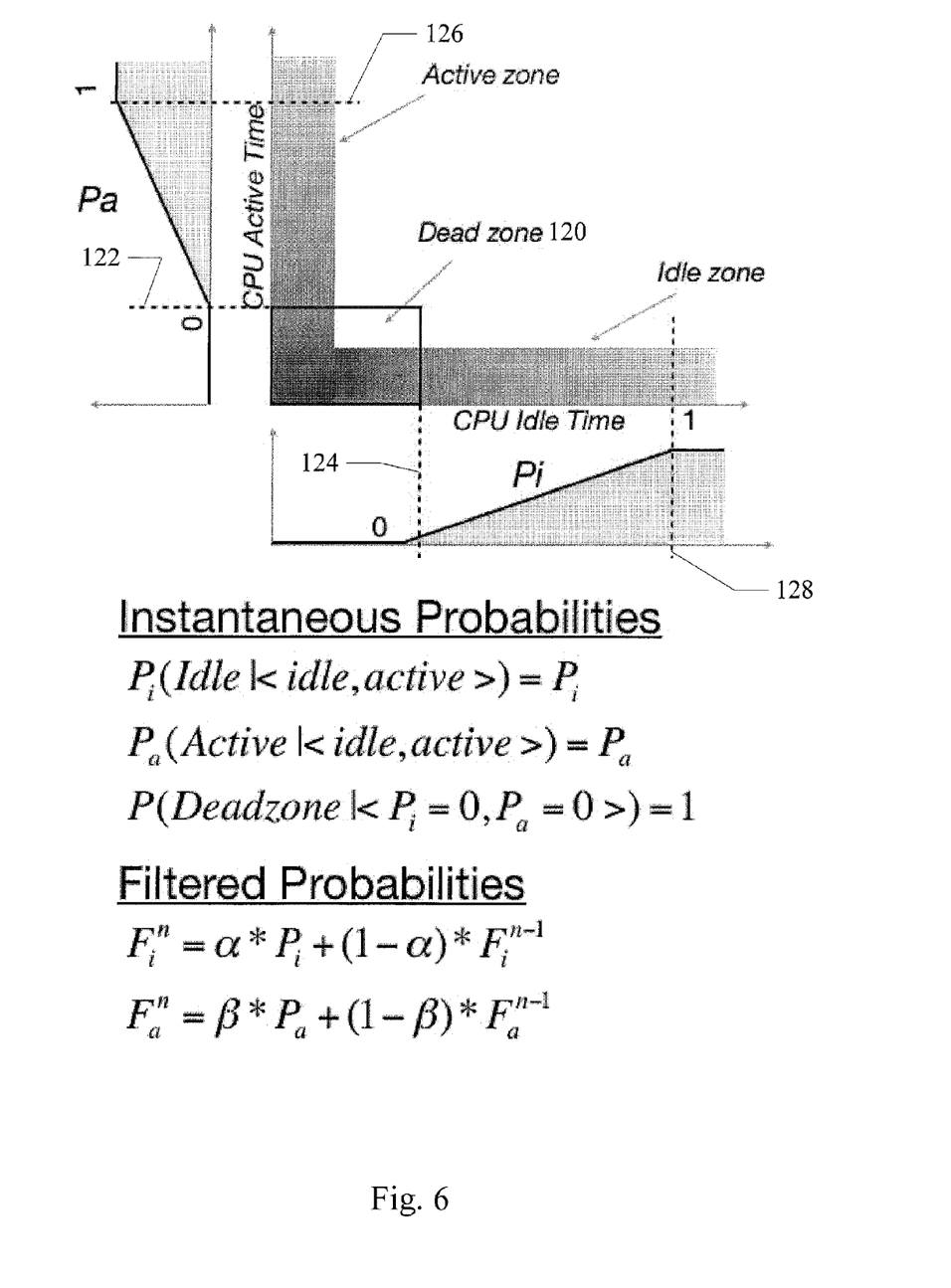
FIG. 6 is diagram illustrating one embodiment of a CPU filter.

As mentioned previously, a CPU filter 80 may be used to determine if the processors 28 are to be considered on or off for purposes of display state determination. FIG. 6 is a block diagram illustrating one embodiment of a model used by the CPU filter 80. In this embodiment, probabilities of the processors 28 being active or idle are assigned based on previous active/idle times of the processors 28. The CPU idle time is shown on the horizontal axis in the graph in FIG. 6, and the CPU active time is shown on the vertical axis of the graph. Short active/idle times are relegated to a "dead zone" 120. The dead zone 120 may be defined as an active time less than a first threshold and an idle time less than a second threshold, illustrated by dotted lines 122 and 124 in FIG. 6 respectively. The first and second thresholds may be the same amount of time, or may be different, in various embodiments. The first and second thresholds may be a programmable parameter, or fixed, in various embodiments. A probability that the CPU is active ($P_a$) and a probability that the CPU is idle ($P_i$) are both assigned to zero in the dead zone 120.

CPU active times greater than the first threshold and up to a first cap (dotted line 126) may be linearly mapped to a probability between 0 and 1 that the CPU is active ($P_a$). CPU active times greater than the first cap are assigned a probability of 1. Similarly, CPU idle times between the second threshold and a second cap (dotted line 128) may be linearly mapped to a probability between 0 and 1 that the CPU is idle ($P_i$). CPU idle times greater than the second cap are assigned a probability of 1. The first and second caps may be the same value or different values, and may be fixed or programmable as well. Other embodiments may map active/idle times to probabilities in other fashions or using other functions.

The probabilities assigned as above are instantaneous probabilities ($P_a$, $P_i$). These probabilities may be generated at each CPU idle event and CPU wake event. In some embodiments, the probabilities are filtered with history (e.g. as captured by the most recent filtered probabilities, as shown in the equations below the graph in FIG. 6). Thus, filtered active probability $F_a$ and filtered idle probability $F_i$ may be generated. The filtered probabilities may be provided to the PMGR driver 82 to determine a CPU on/off state for dynamic/idle display detection. The filter factors alpha and beta may be programmable parameters, and may be selected empirically based on how well the filtered probabilities predict the actual on/off state of the processors 28.

Figures 7, 8:
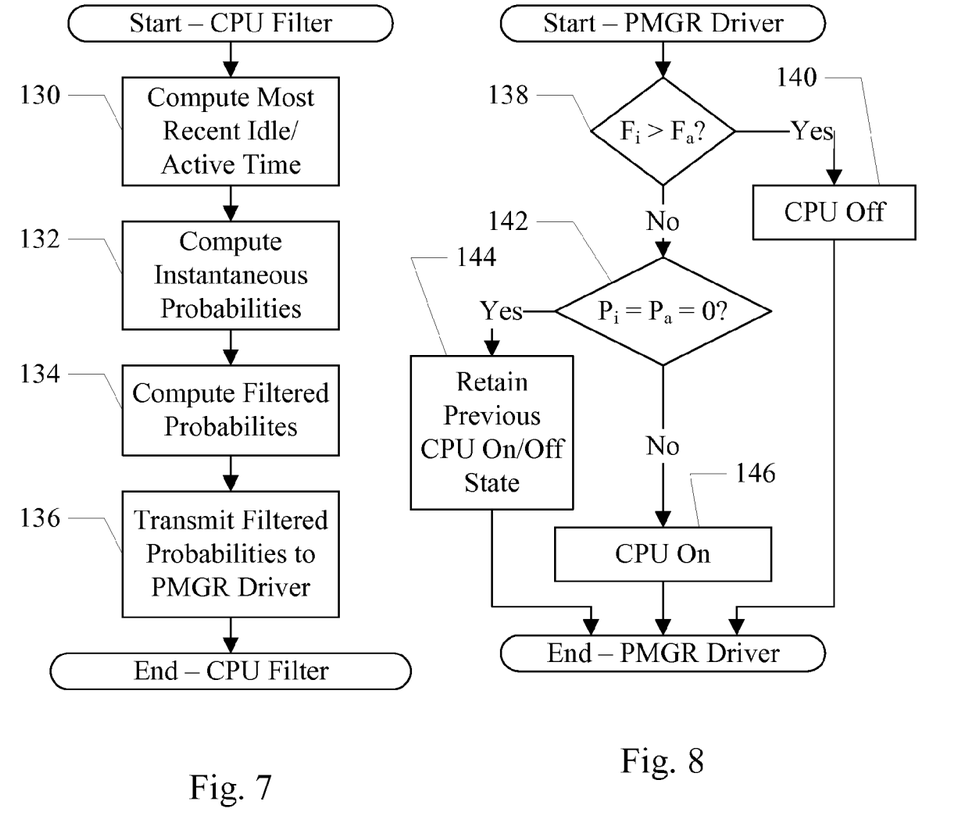
FIG. 7 is a flowchart illustrating operation of one embodiment of a CPU filter.
FIG. 8 is a flowchart illustrating operation of one embodiment of a PMGR driver in response to the CPU filter.

FIG. 7 is a flowchart illustrating operation of one embodiment of the CPU filter 80. While the blocks are shown in a particular order for ease of understanding, other orders may be used. In an embodiment, the operation of FIG. 7 may be implemented in software, and thus the software may include instructions which, when executed, implement the operation shown in FIG. 7. Other embodiments may implement the features shown in FIG. 7 in hardware and/or a combination of hardware and software.

The CPU filter 80 may be configured to execute at the entry and exit of an idle state. The idle state may be a state in which the processors 28 are not actively performing work. The idle state may include sleep states, in which the processors 28 remain powered but are not executing instructions, as well as a powered down state in which the processors 28 are powered off. Thus, the CPU filter 80 need not cause the processors 28 to be woken up periodically merely to execute the filter 80. Instead, the filter 80 may be executed when the processors 28 are awakened for other reasons.

The CPU filter 80 may compute the most recent idle/active time (block 130). For example, an idle time may be computed when the CPU filter 80 is executed during exit from the CPU idle state. An active time may be computed during entry to the CPU idle state. The active/idle time may be computed from a dedicated, free running timer that the CPU filter 80 may clear each time the active/idle time is computed. The free running timer may be incremented based on the processor clock or a clock in the SOC 10 that is used by the PMGR 32, in various embodiments. In another embodiment, a timer that is used on the SOC 10 for a variety of purposes may be used (e.g. a time base register). In such an embodiment, the CPU filter 80 may read the timer and compute the difference between the current value read from the timer and a previous value read by the CPU filter 80 from the timer.

Based on the most recent active and idle times, the CPU filter 80 may compute the instantaneous probabilities ($P_a$, $P_i$) (block 132). The CPU filter 80 may compute the filtered probabilities ($F_a$, $F_i$) for the current time based on the instantaneous probabilities and the previous filtered probabilities (block 134). The CPU filter 80 may transmit the filtered probabilities to the PMGR driver 82 to compute the CPU on/off state (block 136). Alternatively, the CPU filter 80 may compute the CPU on/off state from the filtered probabilities and may transmit the CPU on/off state to the PMGR driver 82.

Turning next to FIG. 8, a flowchart illustrating operation of one embodiment of the PMGR driver 82 to determine CPU on/off state responsive to the filtered probabilities from the CPU filter 80. As mentioned above, the operation of FIG. 8 may be implemented in the CPU filter 80, in other embodiments. While the blocks are shown in a particular order for ease of understanding, other orders may be used. In an embodiment, the operation of FIG. 8 may be implemented in software, and thus the software may include instructions which, when executed, implement the operation shown in FIG. 8. Other embodiments may implement the features shown in FIG. 8 in hardware and/or a combination of hardware and software.

If the filtered probability of being idle ($F_i$) is greater than the filtered probability of being active ($F_a$) (decision block 138, "yes" leg), the PMGR driver 82 may determine that the CPU is off (block 140). If the instantaneous probabilities ($P_a$, $P_i$) are both zero because the current idle/active time is in the dead zone 120 (decision block 142, "yes" leg), the PMGR driver 82 may retain the previously-determined CPU on/off state (block 144). That is, if the most recently determined CPU on/off state is off, the CPU on/off state remains off. Similarly, if the most recently determined CPU on/off state is on, the CPU on/off state remains on. Finally, if the filtered probability of being idle (Fi) is not greater than the filtered probability of being active (Fa) and the instantaneous probabilities (Pi, Pa) are not both zero (decision blocks 138 and 142, "no" legs), the PMGR driver 82 may determined that the CPU on/off state is on (block 146).

Figure 9:
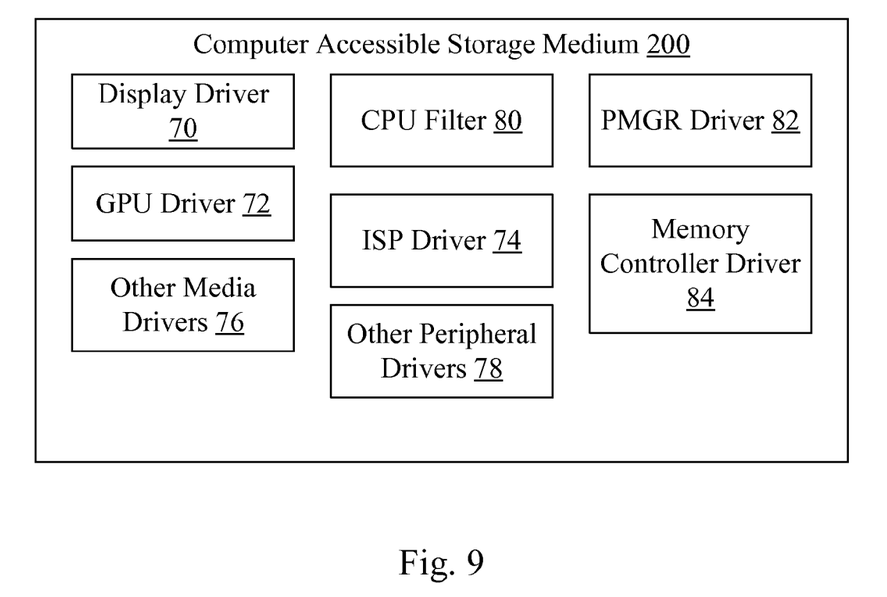
FIG. 9 is a block diagram of one embodiment of a computer accessible storage medium.

FIG. 9 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile. More particularly in one embodiment used in portable devices such as cell phones, tablets, etc., the computer accessible storage medium 200 may include the memory 12 and/or non-volatile memory such as flash memory included in the device.

The computer accessible storage medium 200 in FIG. 9 may store the various software described herein. For example, the computer accessible storage medium may store one or more of the display driver 70, the GPU driver 72, the other media drivers 76, the CPU filter 80, the ISP driver 74, the other peripheral drivers 78, the PMGR driver 82, and the memory controller driver 84. The various drivers 70, 72, 74, 76, 78, 82, and 84 and the CPU filter 80 may include instructions which, when executed by a processor 28, implement the operation described for each driver above. Furthermore, the PMGR driver 82 may include the instructions which, when executed, implement the operation illustrated in FIGS. 2, 3, 5, and/or 8. The CPU filter 80 may include instructions which, when executed, implement the operation shown in FIG. 7 and/or FIG. 8. A carrier medium may include computer accessible storage media as well as transmission media such as wired or wireless transmission.

Figure 10:
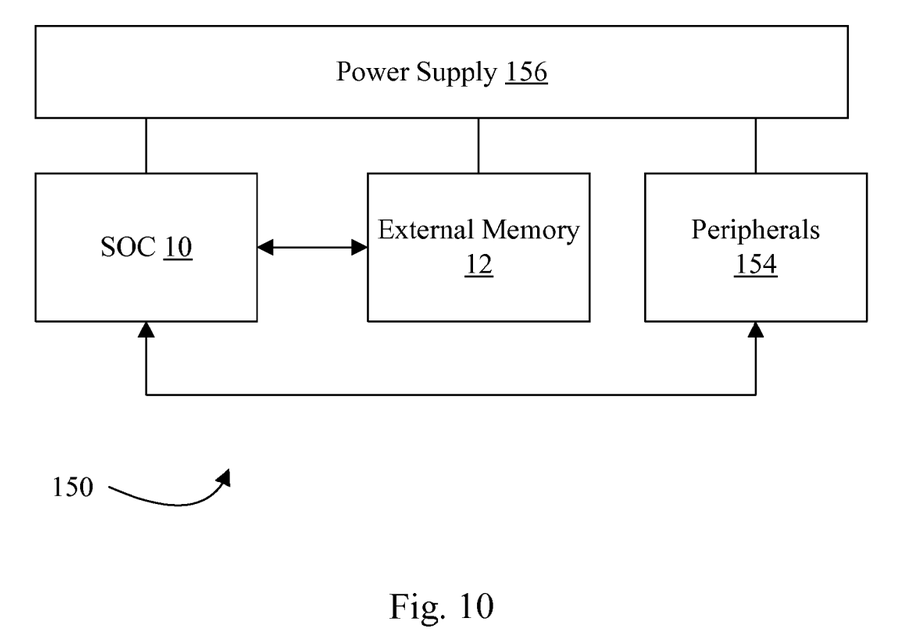
FIG. 10 is a block diagram of another embodiment of a system including the SOC shown in FIG. 1.

Turning next to FIG. 10, a block diagram of one embodiment of a system 150 is shown. In the illustrated embodiment, the system 150 includes at least one instance of the SOC 10 coupled to one or more peripherals 154 and the external memory 12. A power supply 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. The displays 20 and/or image sensors 26 may be peripherals 154, in some embodiments. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A method comprising:
    detecting an idle screen for a display device in a system that includes a plurality of components, a memory cache, and a memory system, wherein the memory cache caches data for memory operations from the plurality of components;
    responsive to detecting the idle screen, enabling caching of frame data in the memory cache, wherein caching of frame data is disabled during times that the idle screen is not detected;
    transmitting first read memory operations to read the frame data when caching of frame data is enabled;

the memory cache caching at least a portion of the frame data read in response to the first read memory operations;

transmitting second read memory operations to read the frame data when caching of frame data is disabled; and the memory cache not caching the data read in response to the second read memory operations.

2. The method as recited in claim 1 further comprising: responsive to detecting the idle screen, modifying power management configuration in the memory cache.

3. The method as recited in claim 2 wherein the modifying comprises disabling cache power down in the memory cache.

4. The method as recited in claim 2 wherein the modifying comprises disabling memory cache size reduction.

5. The method as recited in claim 1 further comprising: detecting an exit from the idle screen; and
responsive to detecting the exit, disabling caching of the frame data in the memory cache.

6. The method as recited in claim 5 further comprising, responsive to detecting the exit:
enabling cache power down in the memory cache; and
enabling memory cache size reduction.

7. The method as recited in claim 5 wherein detecting the exit comprises detecting that at least one of the plurality of components is to be powered on.

8. The method as recited in claim 5 wherein detecting the exit comprises detecting that a graphics device is requesting to be powered on.

9. The method as recited in claim 5 further comprising:
filtering wake/sleep events for one or more processors in the system; and
detecting the exit responsive to the filtered wake/sleep events indicating that the processor is potentially active.

10. An apparatus comprising:
a memory system;
a plurality of components;
a memory cache coupled to the memory system and the plurality of components, wherein the plurality of components are configured to access the memory system and the memory cache is configured to cache at least a portion of data from the memory system read by the plurality of components, and wherein the memory cache is checked for a hit prior to accessing the memory system in response to a memory operation; and
a display controller coupled to the memory cache and the memory system, wherein the display controller is configured to generate memory operations to read at least one frame buffer stored in the memory system to display an image on a display device, and wherein the display controller is programmable to request allocation in the memory cache for the frame buffer data when transmitting the memory operations, and wherein the display controller is programmed during use to request allocation in response to the image on the display device being idle, and wherein the display controller is programmed during use not to request allocation in response to the image on the display device being dynamic.

11. The apparatus as recited in claim 10 wherein the plurality of components comprise one or more processors configured to execute a plurality of instructions stored in the memory system, and wherein the plurality of instructions, when executed, detect the idle image and the dynamic image.

12. The apparatus as recited in claim 11 wherein the plurality of instructions include a display driver for the display controller, and wherein the display driver is configured to program the display controller to request cache allocation responsive to the idle image and to not request cache allocation in response to the dynamic image.

13. The apparatus as recited in claim 12 wherein the display driver is configured to detect N consecutive static frames, where N is an integer greater than 1, and wherein the image is dynamic unless the N consecutive static frames have been detected.

14. The apparatus as recited in claim 13 further comprising a power manager circuit, and wherein the plurality of instructions includes a plurality of drivers, each driver of the plurality of drivers corresponding to a respective one of the plurality of components, and wherein the plurality of instructions include a power manager driver corresponding to the power manager circuit, and wherein the plurality of drivers are configured to communicate power up and power down requests to the power manager driver for their respective components, and wherein the power manager driver is configured to detect the idle image and dynamic image responsive to the power up and power down requests in addition to the N consecutive static frames.

15. The apparatus as recited in claim 11 wherein the plurality of instructions include a memory driver for the memory system and the memory cache, wherein the memory driver is configured to program the memory cache to modify a power management configuration of the memory cache responsive to detecting the idle image and the dynamic image.

16. The apparatus as recited in claim 15 wherein the memory driver is configured to disable cache power down responsive to the idle image.

17. The apparatus as recited in claim 15 wherein the memory driver is configured to disable cache automatic resizing responsive to the idle image.

18. A non-transitory computer accessible storage medium storing a plurality of instructions executable by one or more processors in an integrated circuit that also includes a display controller, a memory controller that includes a memory cache, a plurality of components, and a power manager circuit, the plurality of instructions including:
a power manager driver corresponding to the power manager circuit;
a memory driver corresponding to the memory controller; and
a display driver corresponding to the display controller, wherein the display driver detects that the image being displayed has been static for N consecutive frames, where N is an integer greater than one, and wherein the power manager driver detects an idle display mode in response to the N consecutive static frames and further responsive to the power manager driver detecting that the plurality of components in the integrated circuit are powered down, and wherein the display driver programs the display controller to enable caching in the memory cache of frame buffer data read by the display controller responsive to the idle display mode, and wherein caching of the frame buffer data in the memory cache is disabled in a dynamic display mode in which fewer then N consecutive static frames have been detected or one or more of the plurality of components are powered up, and wherein the memory driver modifies one or more power management features for the memory cache responsive to the idle display mode, and wherein the memory cache is configured to cache at least a portion of data read by the plurality of components and the display controller.

19. The non-transitory computer accessible storage medium as recited in claim 18 wherein the memory driver disables cache power down responsive to the idle display mode.

20. The non-transitory computer accessible storage medium as recited in claim 18 wherein the memory driver disables cache automatic resizing responsive to the idle display mode.

* * * * *